March 28, 1950     R. T. GLEISEN     2,501,867
FLUID PRESSURE OPERATED SWITCH
Filed Sept. 17, 1947
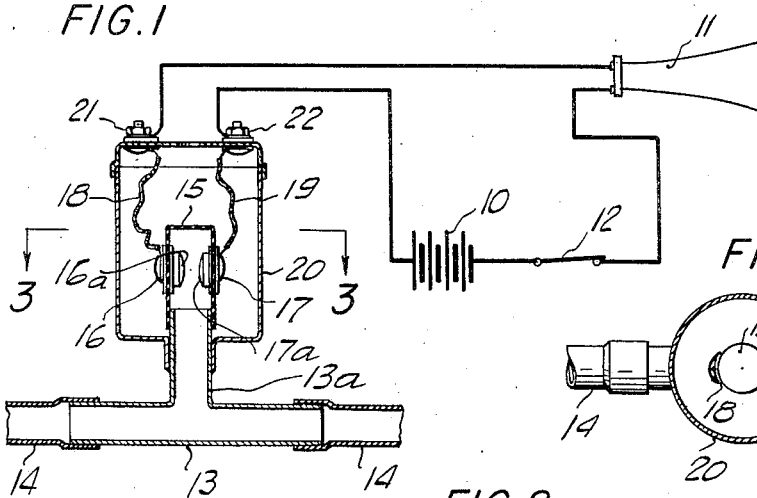
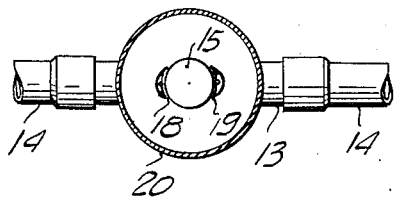
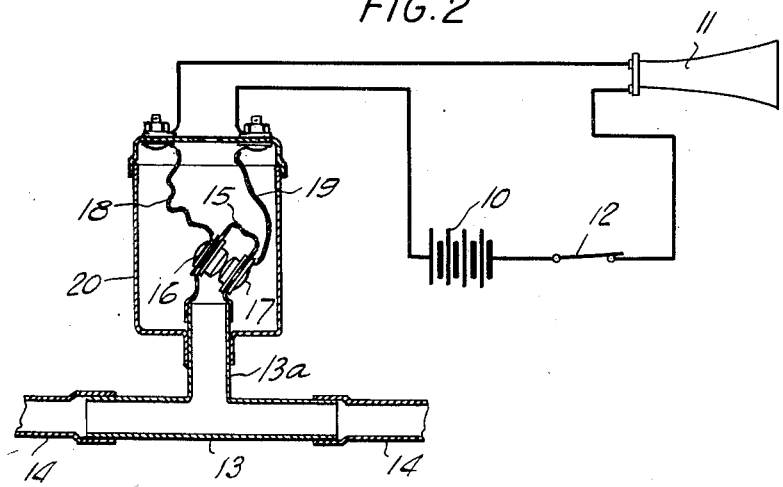
INVENTOR.
RICHARD T. GLEISEN
BY
Henry J. Lucke
Attorney Patented Mar. 28, 1950

2,501,867

UNITED STATES PATENT OFFICE 2,501,867

FLUID PRESSURE OPERATED SWITCH

Richard T. Gleisen, Teaneck, N. J.

Application September 17, 1947, Serial No. 774,574

3 Claims. (Cl. 200—83)

This invention relates to alarm systems, and particularly to those adapted for use in connection with an automotive vehicle for sounding an alarm upon unauthorized starting of the motor.

Pursuant to my invention I utilize the suction effect of the intake manifold of the motor to close an electric circuit in which a signal device, for example the customary horn furnished as standard equipment with almost all automotive vehicles, is connected.

An object of the invention is to provide a system of the above type which is exceedingly simple and inexpensive and which can be quickly and conveniently installed on practically any make of automotive vehicle, either at the factory during construction of the vehicle, or later, by the user, as an accessory.

I accomplish this by operably associating make-and-break contacts of an electric alarm control circuit with a suction-responsive flexible resilient diaphragm. Such make-and-break contacts are advantageously mounted in opposing spaced relationship on the inner wall surfaces of a cupped flexible resilient cap which seals an opening communicating with the intake manifold of the motor. When the cap is collapsed by reason of suction in the intake manifold at any time the motor is running, the contacts are moved into make position. When the motor is stopped, the resiliency of the cap causes it to reassume its normal cupped shape, thereby breaking the circuit. A manually operated switch is included in the electric circuit so the alarm arrangement can be made inoperative during authorized use of the vehicle.

Further objects and features of the invention will be apparent from the following detailed description of the preferred specific embodiment illustrated in the accompanying drawing.

In the drawing:

Fig. 1 illustrates schematically an installation conforming to the invention, the suction-operated, make-and-break contact arrangement being shown in vertical section and in the break position maintained when the motor is not running;

Fig. 2 is a corresponding view, but showing the said contact arrangement in the collapsed make position assumed when the motor is running; and Fig. 3 is a horizontal section taken on the line 3—3, Fig. 1.

Referring now to the drawing, the illustrated installation comprises an electric circuit including an electrical storage battery 10 and a signal device 11. The former is conveniently the customary battery which serves the vehicle for all electrical purposes, and the latter is preferably the horn normally furnished as standard equipment with any automotive vehicle.

These are connected in electrical series with a contact make-and-break control arrangement associated with the intake manifold and operated thereby. Such arrangement is described in detail hereinafter. A manually operated switch 12 is connected in the circuit for rendering the alarm inoperative during authorized use of the vehicle.

The contact make-and-break control arrangement aforementioned includes connector piping communicating with the intake manifold of the motor of the vehicle, each piping here taking the form of a T-fitting 13 interposed in the customary suction line 14 running from the intake manifold (not shown) to the windshield wiper. While this will ordinarily be the most convenient connection, it will be obvious that a variety of other piping arrangements and connections may be used with equally satisfactory operative results, the only requisite being that a service opening—here the open branch 13a of T-fitting 13—be provided for accommodating a suction-responsive diaphragm.

As shown, the suction-responsive diaphragm 15 is a cupped flexible resilient cap of rubber or the like fitted over the open branch 13a and preferably sealed thereto by a suitable adhesive, such as ordinary glue. The diaphragm thus comprises a cylinder closed at one end, and is formed of resilient material having sufficient stiffness to retain its shape under atmospheric pressure within the cylinder. A high quality para rubber such as employed in the manufacture of nursing nipples is a satisfactory material, and may be molded to proper cupped configurations. However, it is also satisfactory to utilize a short section of a flexible rubber tubing, pinched together and sealed at one end, for the purpose.

Associated with the suction-responsive diaphragm and arranged to be operated thereby are a pair of electrical make-and-break contacts which are connected into the afore-described electric circuit for controlling the same.

Here, the cylinder or cap 15 has the electric terminal posts 16 and 17 passing through its walls, and riveted in place therein, to position the respective make-and-break contacts 16a and 17a in spaced diametrically opposing relationship interiorly of the cap. Wiring connection is conveniently made with the respective leads 18 and 19 of the alarm circuit by soldering, as shown.

A protective casing 20, whose interior is freely open to the atmosphere, is advantageously positioned about the cap 15, the electric wiring passing therethrough preferably through the intermediacy of binding posts 21 and 22 for completion of the alarm circuit as indicated.

When the motor is not running the cylinder or cap 15 maintains the make-and-break contacts 16a and 17a in break relationship, as shown in Fig. 1. The manually operated control switch 12 may then be closed, as indicated, without completing the alarm circuit. If at any time that the switch is closed the motor is started, the suction effect in the manifold, manifesting through the piping 14 and 13, will immediately collapse the cap 15, see Fig. 2, and thereby force the contacts 16a and 17a into make relationship, completing the alarm circuit and sounding the horn 11. The horn will sound, or any other signal that is substituted therefore will be maintained, until either the motor is stopped or the control switch 12 thrown open.

Accordingly, by placing the control switch 12 at a location where it is not easily noticeable or conveniently accessible to a thief, the authorized user is provided with an extremely effective safeguard against theft of the vehicle.

I have indicated above that the T-fitting 13 is conveniently interposed in the suction line leading from the intake manifold to the windshield wiper, such line being here designated 14. This is a highly desirable arrangement since it is only necessary to cut out a section of such line 14, which is usually a rubber hose, and slip into place the T-fitting 13.

Whereas this invention is here illustrated and described with respect to a preferred specific form of the invention it should be understood that various changes may be made therein and various other forms constructed, on the basis of the teachings hereof, by those skilled in the art without departing from the scope of the following claims.

I claim:

1. In combination, connector piping adapted for connection with a vacuum-inducing source; a cupped flexible resilient cap of collapsible character sealing an end of said connector piping, said cap being collapsible under the influence of a vacuum condition interiorly thereof; and a pair of individual electric contacts arranged in spaced opposing relationship on the inner wall faces of the cap for make when the cap is collapsed.

2. An electric switch comprising a cylinder closed at one end, said cylinder being formed of resilient material having sufficient stiffness to retain its shape under atmospheric pressure within said cylinder but being collapsible under reduced pressure within said cylinder, diametrically opposed electrical contacts fixed in the walls of said cylinder and extending therethrough, and terminal posts external to said cylinder connected to said electrical contacts, whereby reduced pressure within said cylinder will collapse said cylinder and cause said electrical contacts to meet and close an external circuit connected across said terminal posts.

3. An electric switch comprising a cylinder closed at one end, said cylinder being formed of rubber having sufficient stiffness to retain its shape under atmospheric pressure within said cylinder but being collapsible under reduced pressure within said cylinder, diametrically opposed electrical contacts fixed in the walls of said cylinder and extending therethrough, and terminal posts external to said cylinder connected to said electrical contacts, whereby reduced pressure within said cylinder will collapse said cylinder and cause said electrical contacts to meet and close an external circuit connected across said terminal posts.

RICHARD T. GLEISEN.

REFERENCES CITED

The following references are of record in the file of this patent:

UNITED STATES PATENTS

| Number | Name | Date |
|---|---|---|
| 1,223,060 | Louthan | Apr. 17, 1917 |
| 1,245,239 | Keller et al. | Nov. 6, 1917 |
| 1,414,912 | Whittingham | May 2, 1922 |
| 1,589,523 | Ferrer | June 22, 1926 |
| 1,620,493 | Schindler | Mar. 8, 1927 |
| 2,406,719 | Upson | Aug. 27, 1946 |